US009071875B2

(12) United States Patent
Chow et al.

(10) Patent No.: US 9,071,875 B2
(45) Date of Patent: Jun. 30, 2015

(54) PROCESSING AND DISTRIBUTION OF VIDEO-ON-DEMAND CONTENT ITEMS

(75) Inventors: Lee M. Chow, Naperville, IL (US); David Piepenbrink, Chicago, IL (US); Stephen Rys, Austin, TX (US); James T. Sofos, Aurora, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 681 days.

(21) Appl. No.: 12/640,206

(22) Filed: Dec. 17, 2009

(65) Prior Publication Data

US 2011/0154382 A1    Jun. 23, 2011

(51) Int. Cl.
H04N 5/445    (2011.01)
H04N 7/173    (2011.01)
H04N 21/472   (2011.01)
H04N 21/262   (2011.01)
H04N 21/258   (2011.01)
H04N 21/25    (2011.01)
H04N 21/4627  (2011.01)
H04N 21/6405  (2011.01)

(52) U.S. Cl.
CPC ... *H04N 21/47202* (2013.01); *H04N 21/26208* (2013.01); *H04N 21/25883* (2013.01); *H04N 21/252* (2013.01); *H04N 21/25841* (2013.01); *H04N 21/25891* (2013.01); *H04N 21/4627* (2013.01); *H04N 21/6405* (2013.01)

(58) Field of Classification Search
CPC . H04N 21/251; H04N 21/252; H04N 21/258; H04N 21/25808; H04N 21/25841; H04N 21/25866; H04N 21/25883; H04N 21/25891; H04N 21/262; H04N 21/26208; H04N 21/26233; H04N 21/26241

USPC .............................................. 725/86, 97, 134
See application file for complete search history.

(56) References Cited

U.S. PATENT DOCUMENTS

| | | | | |
|---|---|---|---|---|
| 5,619,247 A * | 4/1997 | Russo | ........................... | 725/104 |
| 5,790,935 A * | 8/1998 | Payton | ............................ | 725/91 |
| 5,978,381 A * | 11/1999 | Perlman et al. | ............... | 370/432 |
| 7,237,032 B2 * | 6/2007 | Gemmell | ....................... | 709/231 |
| 7,340,759 B1 * | 3/2008 | Rodriguez | ........................ | 725/8 |
| 7,349,921 B2 * | 3/2008 | Hirstius et al. | ......................... | 1/1 |
| 7,539,306 B2 * | 5/2009 | Ohta et al. | .................... | 380/201 |
| 7,697,557 B2 * | 4/2010 | Segel | ............................ | 370/429 |
| 2002/0055942 A1 * | 5/2002 | Reynolds | ....................... | 707/200 |
| 2002/0083456 A1 * | 6/2002 | Bates et al. | ...................... | 725/60 |
| 2002/0120927 A1 * | 8/2002 | Harada et al. | .................... | 725/23 |
| 2002/0133830 A1 * | 9/2002 | Kim et al. | ..................... | 725/142 |

(Continued)

FOREIGN PATENT DOCUMENTS

WO    WO 2009141269 A1 *   11/2009

*Primary Examiner* — James R Sheleheda
(74) *Attorney, Agent, or Firm* — Toler Law Group, PC

(57) ABSTRACT

Systems, methods, and computer-readable media including instructions for processing and distributing video-on-demand (VOD) content items are disclosed. A particular method selects a group of electronic devices to receive a VOD content item. The selection is based on group-level information associated with the group of electronic devices and based on user-level information associated with individual electronic devices of the group of electronic devices. The VOD content item is transmitted to each electronic device of the group via multicast. The VOD content item has an associated validity time period, and the encrypted VOD content item is automatically made unplayable at each electronic device in the group when the validity time period has elapsed.

20 Claims, 6 Drawing Sheets

(56) References Cited

U.S. PATENT DOCUMENTS

| | | |
|---|---|---|
| 2004/0139024 A1* | 7/2004 | So .................................. 705/51 |
| 2007/0121612 A1* | 5/2007 | Nadeau et al. ............... 370/386 |
| 2007/0130585 A1* | 6/2007 | Perret et al. .................... 725/46 |
| 2007/0261088 A1* | 11/2007 | Phillips et al. ................. 725/97 |
| 2009/0193486 A1* | 7/2009 | Patel et al. .................... 725/114 |
| 2010/0159976 A1* | 6/2010 | Marocchi et al. ............. 455/519 |
| 2010/0205641 A1* | 8/2010 | Charania et al. ................ 725/87 |
| 2011/0072075 A1* | 3/2011 | Gautier ......................... 709/203 |
| 2011/0154382 A1* | 6/2011 | Chow et al. ....................... 725/5 |
| 2012/0173673 A1* | 7/2012 | Dietrich et al. ............... 709/218 |
| 2013/0170541 A1* | 7/2013 | Pace et al. ................ 375/240.02 |

* cited by examiner

US 9,071,875 B2

PROCESSING AND DISTRIBUTION OF VIDEO-ON-DEMAND CONTENT ITEMS

FIELD OF THE DISCLOSURE

The present disclosure is generally related to processing and distributing video-on-demand content items.

BACKGROUND

Video-on-demand (VOD) has become an increasingly popular way for service providers to offer content to customers. Typically, a customer browses available VOD items and selects a particular VOD item to watch. Upon making the selection, the VOD item is streamed from to the user's set-top box (STB) from a server. The VOD item is usually transmitted to the STB via a dedicated unicast channel that is opened between the server and the STB. When multiple customers play the VOD item at the same time, multiple dedicated channels are opened, decreasing available bandwidth at the server and increasing a service provider cost of offering VOD services.

DETAILED DESCRIPTION

Figure 1:
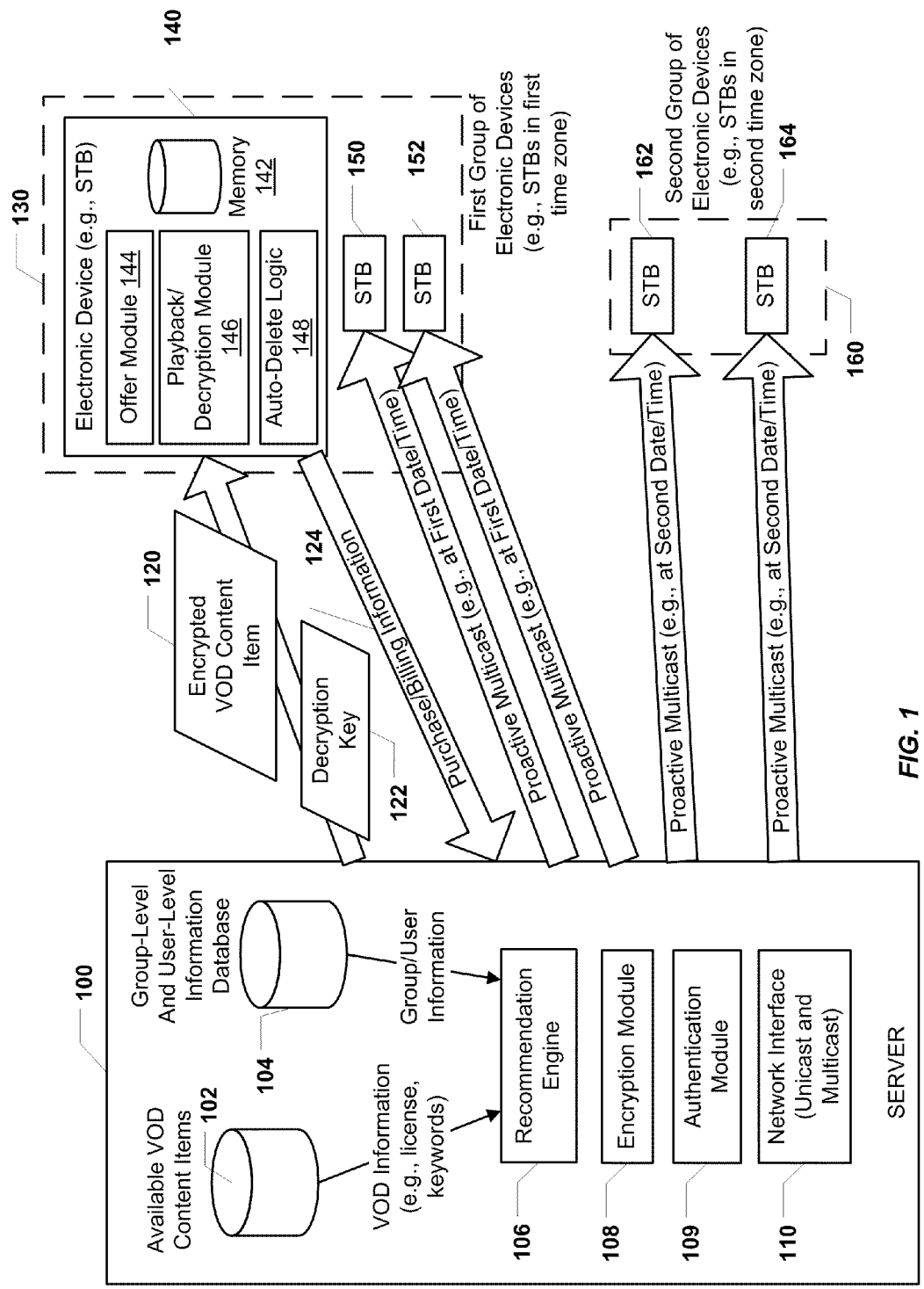
FIG. 1 is a diagram of a particular embodiment of a system of processing and distributing video-on-demand (VOD) content items.

Systems, methods, and computer-readable media are disclosed to proactively "push" video-on-demand (VOD) content to selected groups of electronic devices (e.g., set-top boxes (STBs)) via multicast. A recommendation engine determines whether or not to push a particular VOD content item to the electronic devices in a particular group. The determination is made based on group-level characteristics and user-level characteristics, such as historical data, demographic information, user-provided preferences, and community ratings of VOD content items. When the recommendation engine determines that there is a sufficient likelihood that the particular VOD item will be ordered by the electronic devices within the particular group, the particular VOD content item is multicast to the electronic devices.

In a particular embodiment, a system includes a database configured to store group-level information associated with one or more groups of STBs. The database is also configured to store user-level information associated with individual STBs of the one or more groups of STBs. The system also includes a recommendation engine configured to determine whether to transmit a VOD content item to a particular group of STBs. The determination is based on group-level information associated with the particular group of STBs and based on user-level information associated with individual STBs of the particular group of STBs. The system further includes a network interface configured to multicast the VOD content item to each STB of the particular group of STBs. The VOD content item has an associated validity time period. Once the validity time period has elapsed, the VOD content item becomes unplayable at each STB of the particular group of STBs.

In another particular embodiment, a method includes selecting a group of electronic devices to receive a VOD content item. The selection is based on group level information associated with the group of electronic devices and based on user-level information associated with individual electronic devices of the group of electronic devices. The method also includes encrypting the VOD content item and transmitting the encrypted VOD content item to each electronic device of the group. The transmission occurs via multicast during a non-peak time period. The VOD content item has an associated validity time period, and the encrypted VOD content item is automatically deleted from each electronic device in the group when the validity time period has elapsed.

In another particular embodiment, a computer-readable medium includes instructions, that when executed by a processor, cause the processor to receive a VOD content item from a server, where the VOD content item has an associated offer time period. The instructions also cause the processor to store the VOD content item at a memory and to offer the VOD content item for purchase during the offer time period after the VOD content item is stored. The instructions further cause the processor to receive a purchase indication associated with the VOD content item and to initiate playback of the VOD content item from the memory in response to the purchase indication. The instructions cause the processor to automatically delete the VOD content item from the memory after the offer time period has elapsed.

FIG. 1 depicts a particular embodiment of a system of processing and distributing video-on-demand (VOD) content items. The system includes a server 100 communicatively coupled to a first group 130 of electronic devices and to a second group 160 of electronic devices. For example, the first group 130 may include the set-top boxes (STBs) 140, 150, and 152, and the second group 160 may include the STBs 162 and 164. It should be noted that a STB is merely one example of an electronic device. The groups 130, 160 may alternately include other types of electronic devices, such as televisions, computing devices, personal media players, mobile telephones, and other electronic devices.

The server 100 includes or has access to one or more data storage devices (e.g., disk-based storage) of available VOD content items 102. The available VOD content items 102 may include movies, television shows, sports events, interactive content, games, and other VOD content. Each of the available VOD content items 102 may have associated information such as license information and keywords (e.g., genre keywords, cast keywords, and crew keywords).

The server 100 also includes or has access to a database 104 of group-level information and user-level information, such as historical data, demographic data, user-provided preferences, and community ratings. To illustrate, the database 104 may include group-level information for each of the groups 130 and 160. The database 104 may also include user-level information associated with the STBs 140, 150, 152, 162, and 164.

A recommendation engine 106 is configured to receive VOD information associated with the available VOD content items 102 and group-level and user-level information from the database 104. Based on the received information, the recommendation engine 106 may determine whether or not to proactively push a particular VOD content item to the STBs within a particular group. For example, the recommendation engine 106 may determine that a particular VOD content item should be pushed to the first group 130, because there is a high likelihood that the pushed VOD content item will be subsequently purchased at one or more of the STBs 140, 150, and 152.

Prior to transmission, an encryption module 108 of the server 100 encrypts the VOD content item that is to be pushed. A network interface 110 is configured to transmit the VOD content item to the STBs 140, 150, 152 and 162, 164 of the groups 130 and 160, respectively. In a particular embodiment, VOD content items that are proactively pushed are transmitted by the network interface 110 via multicast, and VOD content items that are not proactively pushed (e.g., streamed upon purchase) are transmitted by the network interface 110 via unicast. For example, the encryption module 108 may generate an encrypted VOD content item 120 and the network interface 110 may proactively multicast the encrypted VOD content item 120 to the first group 130, including the STBs 140, 150, and 152 of the first group 130, as illustrated in FIG. 1.

In a particular embodiment, proactively pushed VOD content items are transmitted by the network interface 110 via a public network (e.g., the Internet). In another particular embodiment, VOD content items are transmitted directly to STBs, without storing the VOD content items at intermediate central offices. For example, the encrypted VOD content item 120 may be Internet protocol (IP) multicast to the STBs 140, 150, and 152 of the first group 130 via the Internet. The server 100 may also include an authentication module 109. The authentication module 109 may be configured to receive purchase and billing information 124 from the STB 140 and to determine that the encrypted VOD content item 120 is authorized for playback the STB 140. The authentication module 109 may trigger transmission of a decryption key 122 usable at the STB 140 to decrypt and play the encrypted VOD content item 120.

The STB 140 may include a memory 142 to store proactively pushed VOD content items. For example, upon receiving the encrypted content item 120, the STB 140 may store the encrypted content item 120 at the memory 142. The STB 140 may also include an offer module 144 configured to offer the encrypted VOD content item 120 for purchase. For example, the offer module 144 may generate a VOD graphical user interface (GUI) as described with reference to the VOD GUI 500 of FIG. 5. In a particular embodiment, the offer module 144 is further configured to transmit purchase and billing information 124 (e.g., date of purchase, time of purchase, and price of purchase) to the server 110.

The STB 140 may also include a playback and decryption module 146. For example, after the encrypted VOD content item 120 is purchased at the STB 140, the playback and decryption module 146 may request and receive the decryption key 122 from the authentication module 109, where the decryption key 122 is usable to decrypt the encrypted VOD content item 120. The playback and decryption module 146 may initiate playback of the encrypted VOD content item 120 from the memory 142 by using the decryption key 122. The modules 144, 146, 148 may be preinstalled at the STB 140. Alternately, the modules 144, 146, 148 may be downloaded (e.g., from the server 100) during an update procedure.

In a particular embodiment, each proactively pushed VOD content item has an associated offer and validity time period. For example, the encrypted VOD content item 120 may have an offer and validity time period of one week. In such an embodiment, the STB 140 may include logic to render the encrypted VOD content item 120 unplayable once the offer and validity time period has elapsed. Determining that the validity time period elapsed may include examining a validity end time of the encrypted VOD content item 120. Alternately, the determination may be made based on a timestamp of the encrypted VOD content item 120. For example, the STB 140 may include auto-delete logic 148 configured to automatically delete the encrypted VOD content item 120 from the memory 142 after the offer and validity time period has elapsed. It should be noted that deleting an item from the memory 142 or otherwise making an item at the memory 142 unplayable may not involve physically deleting the entire item. Instead, the auto-delete logic 148 may remove a file table entry of the memory 142 corresponding to the item or may mark a storage address space of the memory 142 corresponding to the item as "free." Alternately, the item may be tagged (e.g., in a "valid items list") as "expired."

It should be noted that although not specifically illustrated in FIG. 1, the STBs 150, 152, 162, and 164 may include components that function similarly to the components 142, 144, 146, and 148 of the STB 140.

In operation, the recommendation engine 106 may determine whether to proactively push a particular VOD content item to a particular group of electronic devices via multicast. For example, the recommendation engine 106 may determine that a VOD content item should be pushed to both the first group 130 of electronic devices and the second group 160 of electronic devices based on license information (e.g., release date, release time, and playback restrictions) associated with the VOD content item. The determination may also be based on group-level and user-level information associated with the groups 130, 160 and the STBs 140, 150, 152, 162, and 164 therein. The VOD content item may be encrypted by the encryption module 108, thereby producing the encrypted VOD content item 120, and the network interface 110 may multicast the encrypted VOD content item 120. In a particular embodiment, the multicast occurs during a non-peak time (e.g., a relatively low bandwidth usage time) to reduce possible effects on delivery of other television content. The non-peak time may be determined by a bandwidth monitor at the server 100.

In a particular embodiment, the encrypted VOD content item 120 may be multicast in "rolling" fashion. For example, the STBs 140, 150, and 152 of the first group 130 may be located in a first geographic location in a first time zone and may be coupled to a first central office (not shown), and the STBs 162 and 164 of the second group 160 may be located in a second geographic location in a second time zone and may be coupled to a second central office (not shown). The license information associated with the encrypted VOD content item 120 may indicate that the encrypted VOD content item 120 is to be made available at a particular date (e.g., January $1^{st}$) and particular time (e.g., 8 am). Because the first group 130 and second group 160 may be in different time zones, the encrypted VOD content item 120 may be multicast to the first group 130 at a different date and time (e.g., a first date and time) than to the second group 160 (e.g., at a second date and time). For example, if the first group 130 is in the United States eastern time zone and the second group 160 is in the United States central time zone, the encrypted VOD content item 120 may be multicast to the first group 130 an hour before the encrypted VOD content item 120 is multicast to the second group 160. Thus, in some situations, the date of VOD content delivery may be the same and only the time of VOD content delivery may vary.

Alternately, the encrypted VOD content item 120 may be multicast to both time zones at the same time, but the encrypted VOD content item 120 may include information (e.g., metadata) indicating that offers of the encrypted VOD content item 120 are not to be made at the electronic device until a particular date and time with respect to a particular time zone.

Upon receiving the encrypted VOD content item 120, the STB 140 may store the encrypted VOD content item at the memory 142. The offer module 144 may generate an offer to purchase (e.g., view) the encrypted VOD content item 120. When the offer is accepted, the offer module may send purchase and billing information 124 to the server 100. The playback and decryption module 146 may receive the decryption key 122 from the authentication module 109 and may use the decryption key 122 to decrypt and play the encrypted VOD content item 120 from the memory 120. Upon expiration of an offer and validity time period associated with the encrypted VOD content item 120, the auto-delete logic 148 may automatically delete the encrypted VOD content item 120 from the memory 142. The offer to purchase the encrypted VOD content item 120, including any related data (e.g., a movie trailer when the encrypted VOD content item 120) may also be deleted.

It will be appreciated that the system 100 of FIG. 1 may enable provider-triggered "push" VOD, as opposed to subscriber-triggered "pull" VOD. Thus, service providers may be able to plan bandwidth requirements and reduce monetary costs associated with providing VOD content items. For example, one copy of the encrypted VOD content item 120 may be multicast to multiple STBs (as opposed to multiple copies of the encrypted VOD content item 120 being unicast to the multiple STBs), and each of the STBs may subsequently initiate a VOD purchase order for the encrypted VOD content item 120.

It will also be appreciated that the system 100 of FIG. 1 may provide subscribers with quality and pricing benefits. For example, the server 100 may be able to provide a higher quality (e.g., higher resolution, higher video bitrate, or higher audio bitrate) VOD content item via multicast than via streaming unicast. As another example, a proactively pushed VOD content item may be available for purchase at a lower price than a VOD content item that is to be streamed, because of the lower bandwidth requirement and cost associated with the proactively pushed VOD content item. In a particular embodiment, offers for VOD content items may indicate whether the items have been proactively pushed, as described with reference to FIG. 4.

Figure 2:
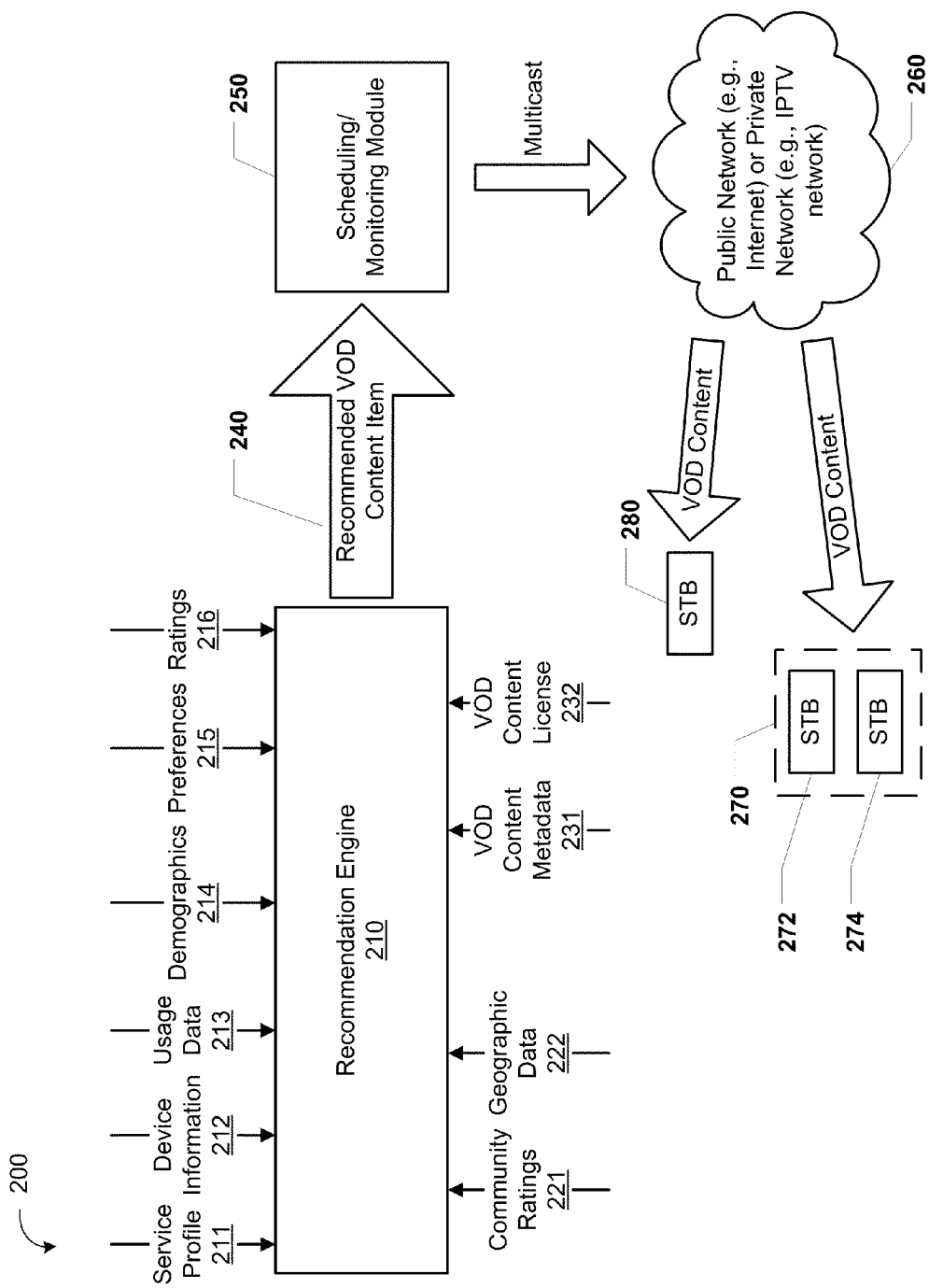
FIG. 2 is a diagram of another particular embodiment of a system of processing and distributing VOD content items.

Referring to FIG. 2 another particular embodiment of a system 200 of processing and distributing VOD content items is depicted. A recommendation engine 210 may be coupled to a scheduling and monitoring module 250. The scheduling and monitoring module 250 may be coupled to a STB 280 and to a group of STBs 270 via a network 260. The network 260 may be a public network (e.g., the Internet) or a private network (e.g., an Internet protocol television (IPTV) network). In an illustrative embodiment, the recommendation engine 210 is the recommendation engine 106 of FIG. 1.

The recommendation engine 210 may recommend that a particular VOD content item be multicast to individual electronic devices (e.g., the STB 280) or a group of electronic devices (e.g., the group of STBs 270 including the STBs 272, 274). The recommendation engine 210 may make the recommendation based on one or more of user-level (e.g., customer-level) data, group-level data, and information associated with the particular VOD content item. For example, customer-level data may include a customer service profile 211, device information 212 (e.g., whether a particular customer's STB is capable of displaying high definition content), customer usage data 213, demographic information 214, customer preferences 215, and customer rating 215 (e.g., ratings the customer has provided for other VOD content). Group-level data may include community ratings 221 (e.g., an average of customer ratings for a particular VOD content item within the group) and geographic data 222 (e.g., neighborhood, city, state, and time zone information) associated with the group. Information associated with the particular VOD content item may include VOD content metadata 231 and a VOD content license 232.

The scheduling and monitoring module 250 may be configured to multicast (e.g., IP multicast) a recommended VOD content item to individual electronic devices (e.g., the STB 280) or a group of electronic devices (e.g., the group of STBs 270) via the network 260. The scheduling and monitoring module 250 may also monitor bandwidth conditions at the network 260 to determine when (e.g., a non-peak time or a scheduled network maintenance time) to perform the multicast.

It will be appreciated that the recommendation engine 210 may perform a multi-factor analysis to determine which VOD content items are to be proactively multicast, thereby increasing a likelihood that the proactively multicast VOD content items will subsequently be purchased. It will also be appreciated that the scheduling and monitoring module 250 may reduce potential disruption of non-VOD services at the STBs 272, 274, 280 by electing to multicast the recommended VOD content items at a non-peak time or during a scheduled network maintenance time window.

Figure 3:
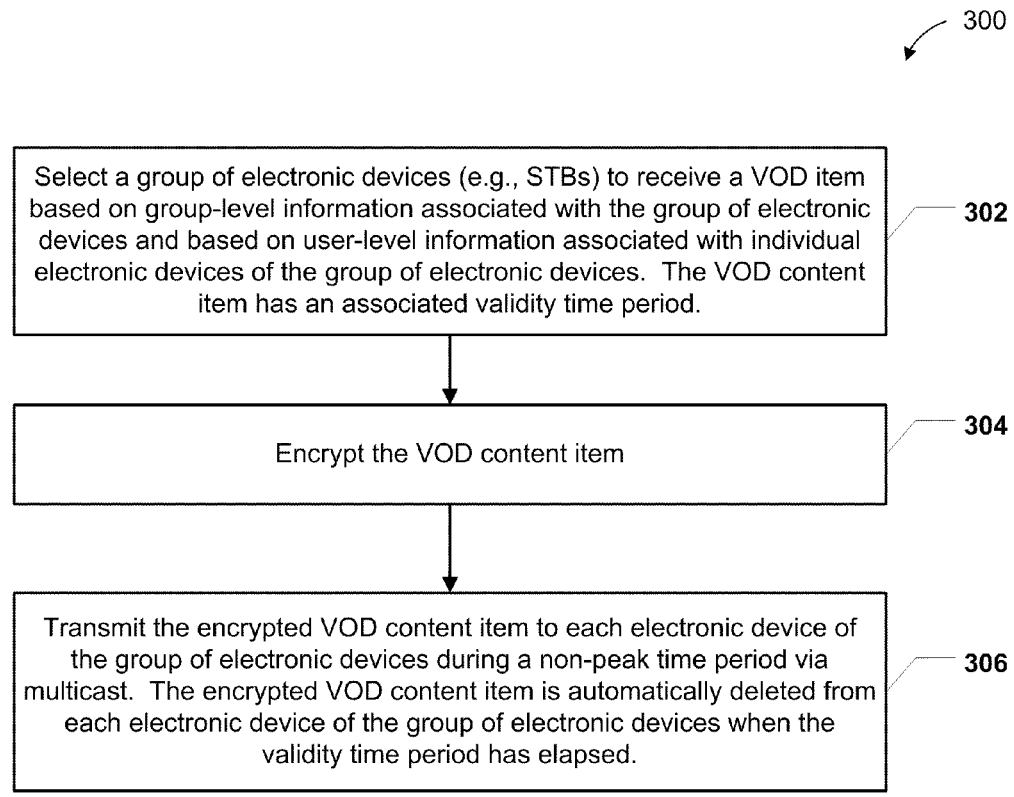
FIG. 3 is a flow diagram of a particular embodiment of a method of processing and distributing VOD content items.

Referring to FIG. 3, a particular embodiment of a method 300 of processing and distributing video on demand (VOD) content items is depicted. The method 300 may be performed at a network element, such as at a processor within the server 100 of FIG. 1.

The method 300 includes selecting a group of electronic devices (e.g. a group of set top boxes (STBs)) to receive a video-on-demand (VOD) content item, at 302. The group of electronic devices is selected based on group level information associated with the group of electronic devices and based on user-level information associated with individual electronic devices of the group of electronic devices. The VOD content item may have an associated validity time period.

The method 300 also includes encrypting the VOD content item, at 304. Encrypting the VOD content item may include digital rights management (DRM) or other methods of making the VOD content item secure against misuse, copying, or other unauthorized acts. A representative type of encryption uses encryption and decryption keys, but other types of encryption or security measures may also be used.

The method 300 further includes transmitting the encrypted VOD content item to each electronic device of the particular group of electronic devices during a non-peak time period via multicast, at 306. The VOD content item is selected and is proactively pushed to multiple electronic devices, such as by multicasting content to a group of set top box devices in a particular geographic region. In a particular embodiment, the encrypted VOD content item is automatically deleted or otherwise made unplayable at each electronic device when the validity time period has elapsed.

The selection of the VOD content item and the selection of the particular electronic devices to receive the VOD content item may be made based on one or more selection criteria. Alternatively, or in addition, the group of STBs may be selected based on a license associated with the VOD content item. The license may include a release date and time, and each electronic device of the group of electronic devices may be located within a first time zone. In this scenario, the encrypted VOD content item may be transmitted to each electronic device of the group of electronic devices at a first date and time corresponding to the release date and time with respect to the first time zone. In the event that user electronic devices are located in different time zones, the method further includes transmitting the encrypted VOD content item to each electronic device in a second group of electronic devices located within a second time zone at a second date and time corresponding to the release date and time with respect to the second time zone.

For example, in FIG. 1, the recommendation engine 106 may receive VOD information, group-level information, and user-level information, and may select a particular group of set top boxes to receive particular VOD content items. The server 100 may multicast the particular VOD content items to the selected group of set top boxes to proactively push content to the set top boxes in an attempt to forecast content items that will be found useful to users. Once the VOD content items have been multicast to the group of electronic devices (e.g. a group of STBs), the service provider may send offers to users of the electronic devices with respect to the VOD content. Alternately, the offers may be generated at the STBs. Since the VOD content items have been proactively multicast to the electronic devices, the service provider may offer higher quality content (i.e. downloaded vs. streamed video) or may offer playback of the multicast VOD content items at a reduced price as compared to other content that would require retrieval and streaming.

In a particular embodiment, the VOD content item has an associated offer and validity time period and the VOD content item is automatically deleted from each electronic device of the particular group of electronic devices when the offer and validity time period has elapsed. For example, the auto-delete logic 148 within the STB 140 may automatically delete the encrypted VOD content item 120 stored at the memory 142 upon expiration of an offer and validity time period associated with the VOD content item 120.

In another embodiment, a peer to peer network capability may be used to multicast portions of encrypted VOD content items to different electronic devices. For example, the method 300 may include transmitting the encrypted VOD content item by multicasting a first portion of the encrypted VOD content item to a first subgroup of electronic devices in the group of electronic devices and multicasting a second portion of the encrypted VOD content to a second subgroup of electronic devices in the group of electronic devices. After multicast of different portions of the encrypted VOD content item to different electronic devices or to different groups or subgroups of electronic devices, the encrypted VOD content may be assembled and made ready for playback on a particular electronic device. For example, playing the encrypted VOD content item at an electronic device in the first subgroup may include receiving the second portion of the encrypted VOD content item from an electronic device in the second subgroup. The second portion of the encrypted VOD content item can be received at the electronic device in the first subgroup from the electronic device in the second subgroup via peer-to-peer (P2P) communication. After the second portion of the encrypted VOD content item is received, the first portion and the second portion may be combined to allow formulation and playback of the complete encrypted VOD content item.

It will be appreciated that the method 300 of FIG. 3 may enable further reduction in bandwidth used to provide VOD content items by multicasting VOD (either as complete files or in portions). It will also be appreciated that the method 300 of FIG. 3 may preserve content security and increase storage capacity at electronic devices by encrypting the multicast VOD content items and by automatically deleting the multicast VOD content items after a time period has elapsed.

Figure 4:
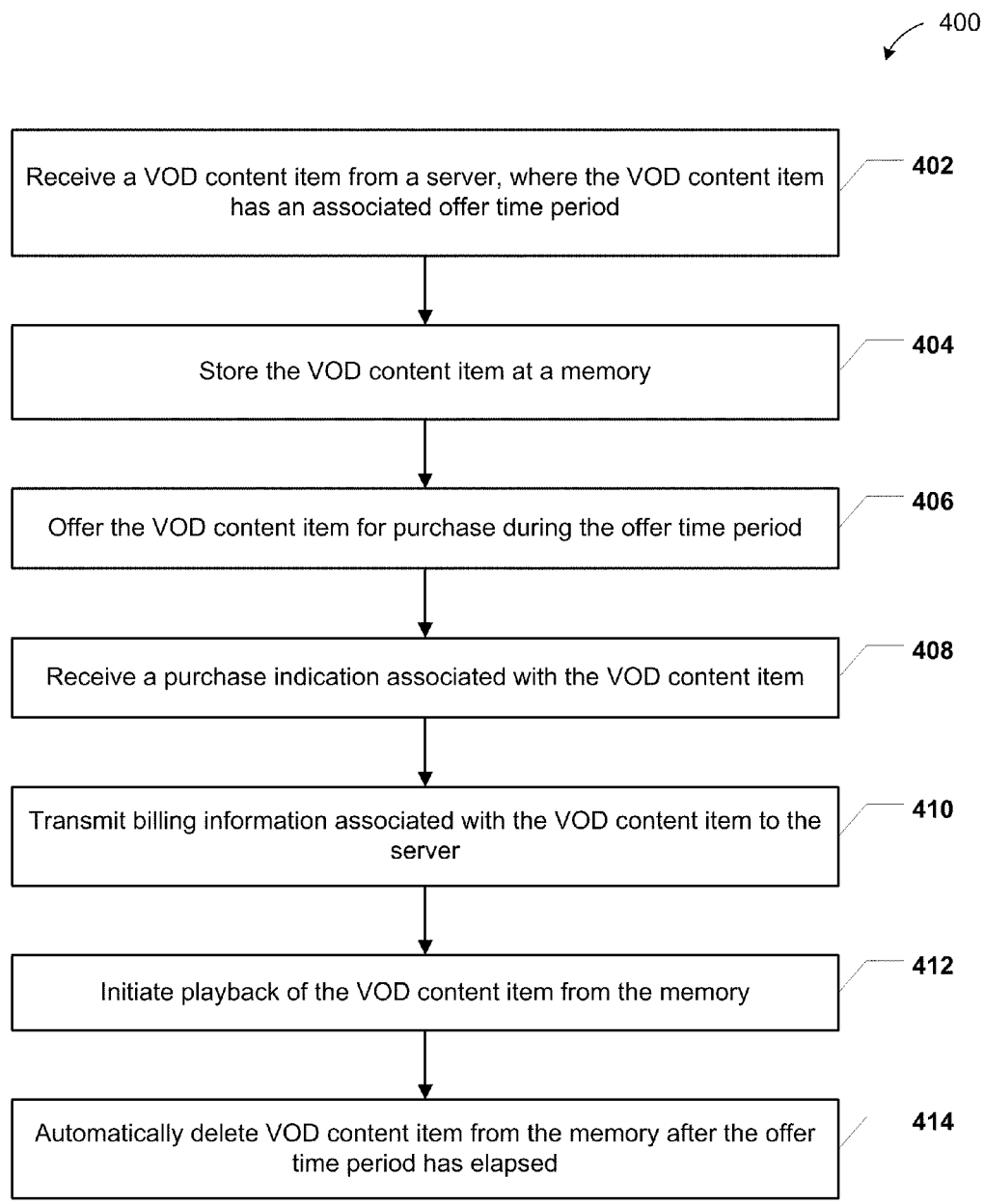
FIG. 4 is a flow diagram of a particular embodiment of a method that may be implemented by an electronic device of FIG. 1.

Referring to FIG. 4, a particular embodiment of a method 400 that may be implemented by an electronic device is shown. In an illustrative embodiment, the method 300 may be performed by an electronic device, such as the STB 140 of FIG. 1.

The method 400 includes receiving a video-on-demand (VOD) content item from a server, at 402. The VOD content item has an associated offer time period. For example, in FIG. 1, the STB 140 may receive the encrypted VOD content item 140 from the server 100.

The method 400 also includes storing the VOD content item at a memory, at 404. For example, in FIG. 1, the encrypted VOD content item 120 may be stored at the memory 142.

After storing the VOD content item, the method 400 includes offering the VOD content item for purchase during the offer time period, at 406. An example of an offer time period may be a day, a week, or a month. For example, in FIG. 1, the offer module 144 may offer the encrypted VOD 120 content item for purchase during the offer time period.

The method 400 also includes receiving a purchase indication associated with the VOD content item, at 408. For example, in FIG. 1, the STB 140 may receive an indication (e.g., via a remote control) that a user of the STB 140 desires to purchase (e.g., view) the encrypted VOD content item 120. The method 400 may also include transmitting billing information associated with the VOD content item to the server, at 410. For example, in FIG. 1, the purchase and billing information 124 may be sent to the server 120. In a particular embodiment, the billing information may include terms of the offer, the indication of acceptance of the offer, and other information for use by the server at a service provider to create a billing entry in a billing system. A user of the electronic device may receive a bill for the purchase of the VOD content item, such as via a monthly service bill from a service provider, or via a credit card bill.

The method 400 further includes initiating playback of the VOD content item from the memory in response to the purchase indication, at 412. For example, in FIG. 1, the playback and decryption module 146 may decrypt and play the encrypted VOD content item 120 from the memory 142.

After the offer time period expires or elapses, the VOD content item may automatically be deleted from the memory of an electronic device (e.g. a STB), at 414. For example, in FIG. 1, the STB 140 includes auto-delete logic 148 that may delete the encrypted VOD content item 120 from the memory 142. In a particular embodiment, purchasing a VOD content item is equivalent to renting the VOD content item for a particular time period (e.g., 24 hours). The VOD content item may be automatically deleted regardless of whether it was purchased. In another particular embodiment, purchasing a VOD content item is equivalent to acquiring ownership rights to the VOD content item. In such an embodiment, the VOD content item may not be deleted upon expiration of the offer time period. Instead, the VOD content item may be decrypted to enable repeated playback.

When the VOD content item is multicast to the electronic device prior to purchase, the offer to purchase, or rent, the VOD content item may provide an indication that the VOD content item had been proactively downloaded and stored prior to purchase. In this case, the offer may have a reduced price or other special terms that apply for the multicast VOD content item. Such special pricing or special terms may not apply to content that was not proactively multicast.

It will be appreciated that the method 400 of FIG. 4 may enable user electronic devices (e.g., STBs) to receive, offer, and play proactively multicast VOD content items. It will thus be appreciated that the method 400 of FIG. 4 may provide users of electronic devices (e.g., STBs) with higher quality VOD content at a lower price than VOD content that is streamed via unicast.

Figure 5:
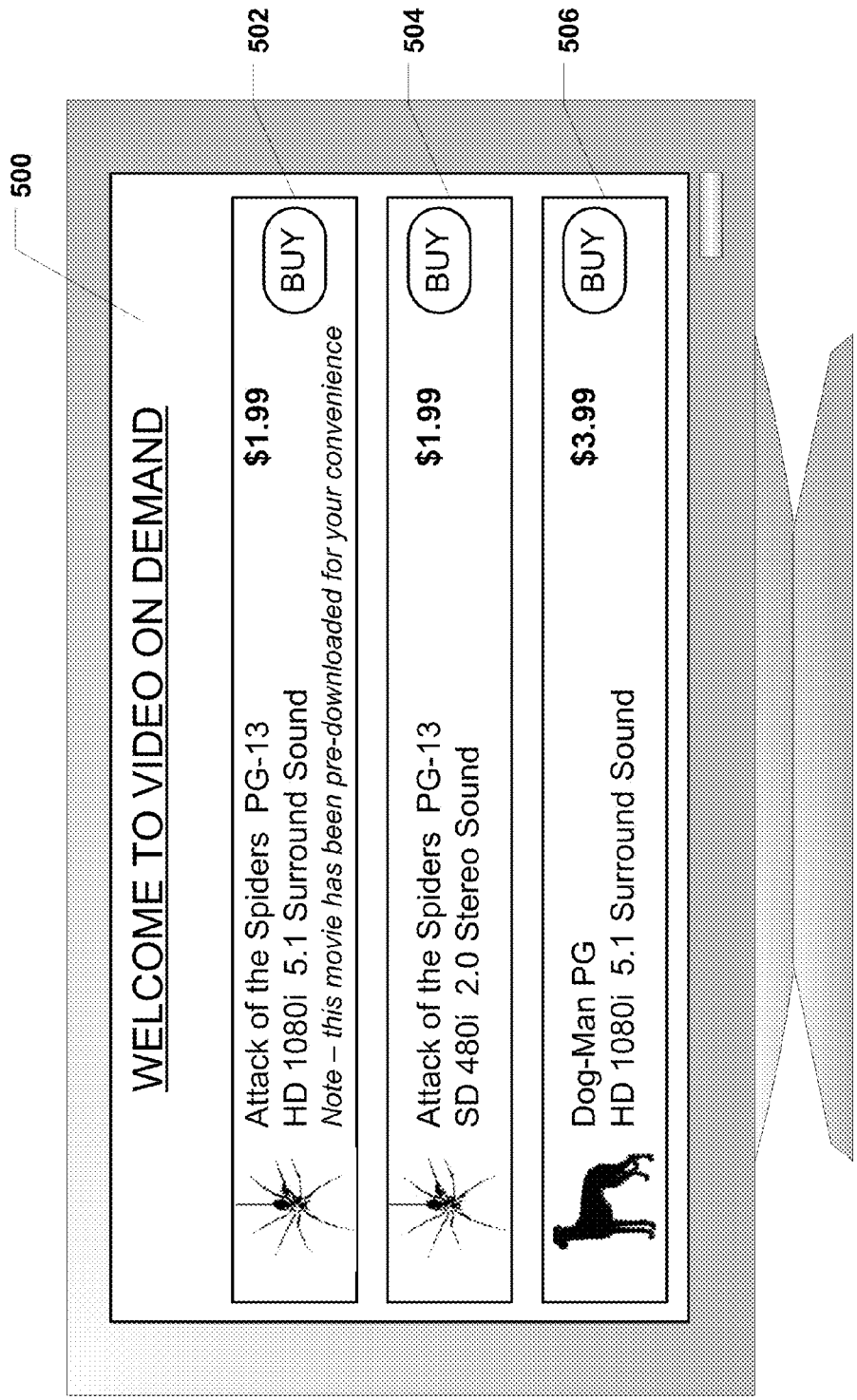
FIG. 5 is a diagram to illustrate a particular embodiment of a VOD graphical user interface.

Referring to FIG. 5, a particular embodiment of a VOD graphical user interface (GUI) 500 is depicted. In an illustrative embodiment, the VOD GUI is generated by the offer module 144 of FIG. 1.

The VOD GUI 500 may include offers to purchase one or more available VOD content items. Some of the available VOD content items may have been proactively pushed via multicast whereas other may not have been proactively pushed. The proactively pushed VOD content items may have a higher quality and/or lower price than VOD content items that have not been proactively pushed. In a particular embodiment, the VOD GUI 500 may indicate which VOD content items have been proactively pushed.

For example, in the particular embodiment illustrated in FIG. 5, the VOD GUI 500 includes three offers 502, 504, and 506 to purchase VOD content items. The first offer 502 indicates that a movie "Attack of the Spiders" is rated PG-13, has been proactively pushed (e.g., downloaded via multicast), and is available at a price of $1.99. The first offer 502 also indicates that the movie includes high definition (HD) 1080i video data and 5.1 surround sound audio data.

The second offer 504 indicates that a standard definition (SD) version of the movie "Attack of the Spiders" is also available for purchase at a price of $1.99. Thus, although the first offer 502 and the second offer 504 are associated with the same movie and have the same price, the proactively pushed version of the movie offered by the first offer 502 has a higher quality (e.g., higher resolution, higher video data bitrate, and higher audio data bitrate) than the version of the movie offered by the second offer 504.

The third offer 506 indicates that a movie "Dog-Man" is rated PG and is available at a price of $3.99. The third offer 506 also indicates that the movie includes HD 1080i video data and 5.1 surround sound audio data. Thus, although the movies offered by the first offer 502 and the second offer 504 have the same quality, the proactively pushed movie offered by the first offer 502 has a lower price.

Figure 6:
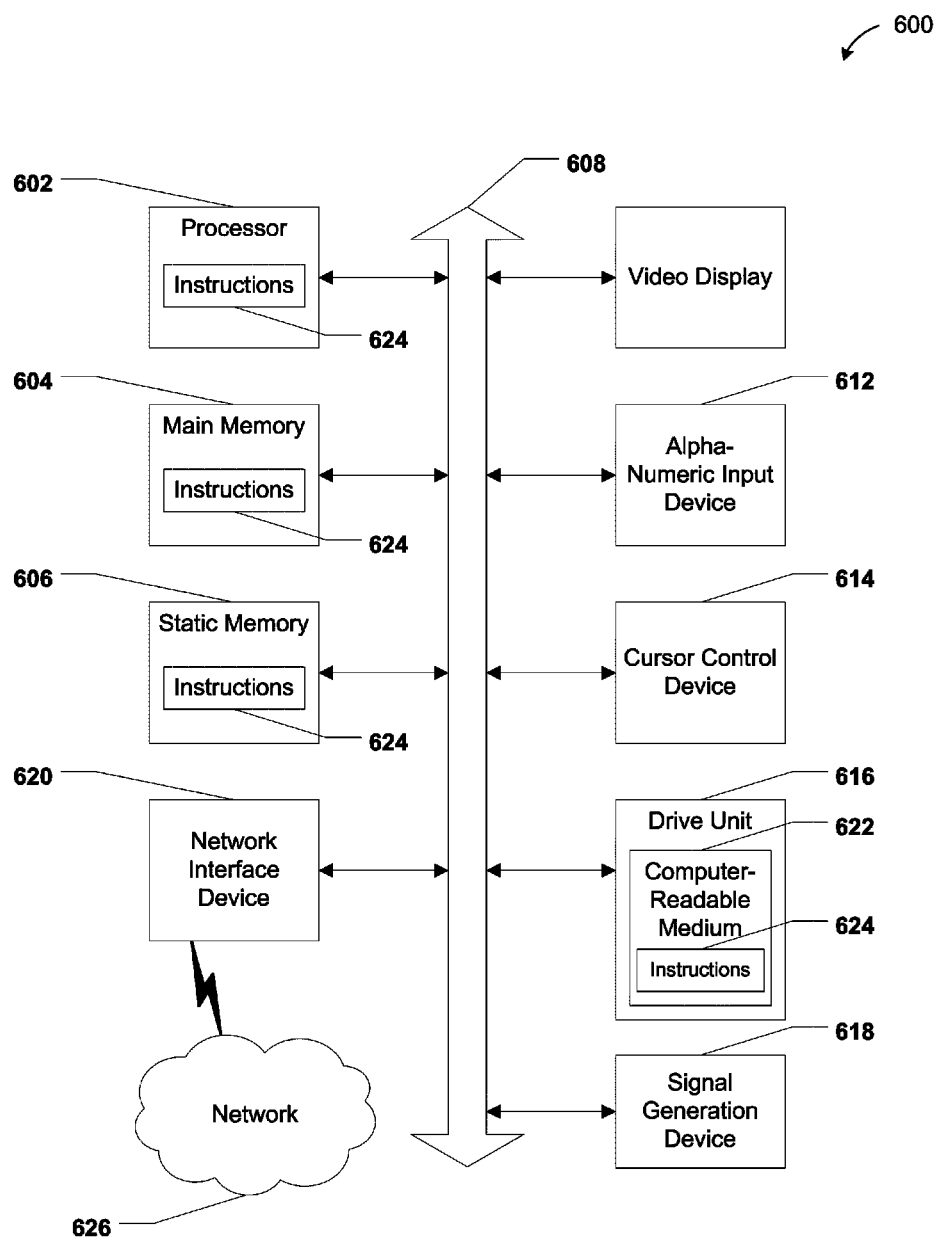
FIG. 6 is a block diagram of a particular embodiment of a general purpose computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices. In an illustrative embodiment, the computer system 600 may include or be incorporated into the server 100 of FIG. 1. In other illustrative embodiments, the computer system 600 may include or be incorporated into the STBs 140, 150, 152, 162, and 164 of FIG. 1 or the STBs 270, 272, and 274 of FIG. 2.

In a networked deployment, the computer system 600 may operate in the capacity of a server or as a client user computer in a server-client user network environment, or as a peer computer system in a peer-to-peer (or distributed) network environment. The computer system 600 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 600 may be implemented using electronic devices that provide video, audio, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 may include a main memory 604 and a static memory 606, which can communicate with each other via a bus 608. As shown, the computer system 600 may further include a video display unit 610, such as a liquid crystal display (LCD), a projection television system, a flat panel display, or a solid state display. Additionally, the computer system 600 may include an input device 612, such as a keyboard, and a cursor control device 614, such as a mouse. The computer system 600 may also include a disk drive unit 616, a signal generation device 618, such as a speaker or remote control, and one or more network interface devices 620 capable of communicating with a network 626. Not all of the components of the computer system 600 of FIG. 6 may be included. For example, some computer systems 600 may not include an input device (e.g., a server may not include an input device).

In a particular embodiment, as depicted in FIG. 6, the disk drive unit 616 may include a computer-readable storage medium 622 in which one or more sets of instructions 624, e.g. software, can be embedded. Further, the instructions 624 may embody one or more of the methods (e.g., the method 300 of FIG. 3 or the method 400 of FIG. 4) or logic (e.g., the recommendation engine 106 of FIG. 1 and the recommendation engine 210 of FIG. 2) as described herein. In a particular embodiment, the instructions 624 may reside completely, or at least partially, within the main memory 624, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable storage medium that stores instructions 624. While the computer-readable storage medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein (e.g., the method 300 of FIG. 3 at the server 100 of FIG. 1 and the method 400 of FIG. 4 at the STB 140 of FIG. 1).

In a particular non-limiting, exemplary embodiment, the computer-readable storage medium may include a solid-state memory such as a memory card or other package that houses one or more non-volatile read-only memories. Further, the computer-readable storage medium may be a random access memory or other volatile re-writable memory. Additionally, the computer-readable storage medium may include a magneto-optical or optical medium, such as a disk or tapes or other storage device. A digital file attachment to an e-mail or other self-contained information archive or set of archives may be considered equivalent to a tangible storage medium. Accordingly, the disclosure is considered to include any one or more of a computer-readable storage medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
a recommendation engine configured to provide a recommendation as to whether to transmit a video-on-demand content item to a group of media devices, wherein the recommendation is based on group-level information associated with the group of media devices and further based on user-level information associated with a particular media device of the group of media devices; and
a network interface configured to multicast the video-on-demand content item to each media device of the group of media devices based upon the recommendation,
wherein the video-on-demand content item is associated with an offer time period, wherein the offer time period is associated with an offer to purchase the video-on-demand content item, wherein the offer is generated at the particular media device based on metadata corresponding to the video-on-demand content item, wherein the offer is presented via the particular media device, wherein the video-on-demand content item is scheduled to be rendered unplayable at the particular media device of the group of media devices in response to expiration of the offer time period, and wherein a start of the offer time period is independent of whether the video-on-demand content item is purchased via the particular media device.

2. The system of claim 1, further comprising:
a processor; and
a memory storing instructions that, when executed by the processor, cause the processor to perform operations including:
encrypting the video-on-demand content item prior to the multicast; and
transmitting a decryption key to the group of media devices, wherein the decryption key is usable to decrypt the video-on-demand content item at a particular media device of the group of media devices in response to determining that the video-on-demand content item is authorized for playback at the particular media device, and wherein the decryption key is automatically deleted from the particular media device in response to expiration of the offer time period.

3. The system of claim 1, wherein the video-on-demand content item is associated with a first purchase price at each media device of the group of media devices and a second purchase price is associated with a second video-on-demand content item at a second particular media device that is not within the group of media devices, wherein the first purchase price is less than the second purchase price.

4. The system of claim 1, wherein the video-on-demand content item is of a higher quality than a second video-on-demand content item that is not multicast to each media device of the group of media devices, and wherein the video-on-demand content item has a higher resolution than the second video-on-demand content item.

5. The system of claim 1, further comprising a scheduling and monitoring module configured to set a transmission time of the multicast during a scheduled network maintenance time window.

6. The system of claim 1, wherein the offer to purchase the video-on-demand content item is presented at an offer start time that is determined based on the metadata associated with the video-on-demand content item, the metadata indicating the offer start time is after a time the video-on-demand content item is received at the particular media device.

7. The system of claim 1, wherein a file table entry corresponding to the video-on-demand content item is removed from a file table to render the video-on-demand content item unplayable.

8. The system of claim 1, wherein a storage address space corresponding to the video-on-demand content item is marked as free to render the video-on-demand content item unplayable.

9. The system of claim 1, wherein a tag corresponding to the video-on-demand content item in a list of tags is set to a particular value to render the video-on-demand content item unplayable.

10. The system of claim 1, wherein a trailer associated with the video-on-demand content item is scheduled to be rendered unplayable at the particular media device in response to expiration of the offer time period.

11. The system of claim 1, wherein the recommendation engine is further configured to:
   determine a first time to multicast the video-on-demand content item to the group of media devices based on geographic data included in the group-level information and based on license information associated with the video-on-demand content item; and
   determine a second time to multicast the video-on-demand content item to a second group of media devices based on second geographic data included in second group-level information associated with the second group of media devices and based on the license information, wherein the second time is different from the first time.

12. A method comprising:
   selecting a group of electronic devices to receive a video-on-demand content item in a multicast transmission based on group-level information associated with the group of electronic devices and based on user-level information associated with a particular electronic device of the group of electronic devices; and
   initiating the multicast transmission of the video-on-demand content item to the group of electronic devices,
   wherein the video-on-demand content item is associated with an offer time period, wherein the offer time period is associated with an offer to purchase the video-on-demand content item, wherein the offer is generated at the particular electronic device based on metadata corresponding to the video-on-demand content item, wherein the offer is presented via the particular electronic device, wherein the video-on-demand content item is available for purchase during the offer time period, and wherein the video-on-demand content item is scheduled to be rendered unplayable at the particular electronic device in response to expiration of the offer time period.

13. The method of claim 12, further comprising determining a first transmission date and time for the multicast transmission based on a license associated with the video-on-demand content item and geographic data included in the group-level information, wherein the license comprises a release date and a release time, wherein each electronic device of the group of electronic devices is located within a first time zone indicated by the geographic data, and wherein the video-on-demand content item is transmitted to each electronic device of the group of electronic devices at the first transmission date and time.

14. The method of claim 13, further comprising:
   determining a second transmission date and time for a multicast to a second group of electronic devices based on the license and second geographic data included in second group-level information associated with the second group of electronic devices, wherein each electronic device of the second group of electronic devices is located within a second time zone indicated by the second geographic data
   transmitting the video-on-demand content item to each electronic device in the second group of electronic devices at the second transmission date and time.

15. The method of claim 12, wherein the group of electronic devices is further selected based on a service profile, device information, usage data, demographic information, a user preference, a user rating, a group rating, geographic data, the metadata of the video-on-demand content item, a license associated with the video-on-demand content item, or any combination thereof.

16. The method of claim 12, wherein the multicast transmission of the video-on-demand content item comprises a multicast of a first portion of the video-on-demand content item to a first subgroup of electronic devices in the group of electronic devices and a multicast of a second portion of the video-on-demand content to a second subgroup of electronic devices in the group of electronic devices.

17. A computer-readable storage device storing instructions that, when executed by a processor, cause the processor to perform operations comprising:
   receiving a video-on-demand content item from a server, wherein the video-on-demand content item is associated with an offer time period, and wherein the video-on-demand content item is scheduled to be rendered unplayable in response to expiration of the offer time period;
   storing the video-on-demand content item at a memory;
   after storing the video-on-demand content item, generating an offer to purchase the video-on-demand content item based on metadata corresponding to the video-on-demand content item;
   presenting the offer to purchase the video-on-demand content item during the offer time period;
   receiving a purchase indication via a user interface in response to presenting the offer to purchase the video-on-demand content item, the purchase indication associated with the video-on-demand content item; and
   initiating playback of the video-on-demand content item stored in the memory in response to receipt of the purchase indication.

18. The computer-readable storage device of claim 17, wherein the operations further comprise:
   transmitting billing information associated with the video-on-demand content item to the server in response to receipt of the purchase indication;
   receiving a decryption key from the server in response to transmitting the billing information to the server, wherein the video-on-demand content item is encrypted; and
   decrypting the video-on-demand content item using the decryption key prior to initiating playback of the video-on-demand content item.

19. The computer-readable storage device of claim 17, wherein presenting the offer to purchase the video-on-demand content item includes indicating that the video-on-demand content item has been proactively downloaded and stored, wherein the offer to purchase is stored in the memory, and wherein the offer to purchase is removed from the memory when the video-on-demand content item is rendered unplayable.

20. The computer-readable storage device of claim 17, wherein, in response to the purchase indication, the video-on-demand content item is not rendered unplayable at the expiration of the offer time period.

* * * * *